United States Patent [19]

Hirsch et al.

[11] Patent Number: 5,448,854
[45] Date of Patent: Sep. 12, 1995

[54] PLANT CONTAINER DRAIN INSERT

[76] Inventors: Jeffrey G. Hirsch; Regina S. Hirsch, both of 701 NW. 40th St., Oklahoma City, Okla. 73118

[21] Appl. No.: 67,478

[22] Filed: May 25, 1993

[51] Int. Cl.⁶ ............................................. A01G 9/02
[52] U.S. Cl. .................................. 47/66; 210/164; 210/455
[58] Field of Search ............. 47/66, 66 D, 79, 80; 210/164, 460, 455

[56] References Cited

U.S. PATENT DOCUMENTS

| | | |
|---|---|---|
| 132,178 | 10/1872 | Pugh . |
| 135,271 | 1/1873 | Gould . |
| 195,094 | 9/1877 | Crowther . |
| 515,032 | 2/1894 | Vestal ............................ 47/66 D |
| 611,523 | 9/1898 | Springer ........................ 47/66 D |
| 842,703 | 1/1907 | Roberts ......................... 47/66 D |
| 1,216,642 | 2/1917 | White . |
| 1,884,204 | 10/1932 | Pilkington . |
| 2,026,679 | 1/1936 | Higgins ............................. 47/34 |
| 2,058,934 | 10/1936 | Yohe ................................. 47/38 |
| 2,084,005 | 6/1937 | Richards ........................... 47/80 |
| 2,110,059 | 3/1938 | Brimm ............................. 294/69 |
| 2,189,982 | 2/1940 | Haglund ............................ 47/80 |
| 2,689,017 | 9/1954 | Schmid ............................ 210/164 |
| 2,834,153 | 5/1958 | Fearn ................................ 47/34 |
| 3,212,416 | 10/1965 | Boersma ......................... 210/164 |
| 4,571,883 | 2/1986 | Shaw ................................. 47/66 |
| 4,860,491 | 8/1989 | Panuski ........................... 47/66 D |
| 4,871,451 | 10/1989 | Piskula ............................ 210/164 |

FOREIGN PATENT DOCUMENTS

| | | | |
|---|---|---|---|
| 815709 | 7/1937 | France ............................ 47/66 D |
| 276343 | 1/1920 | Germany ........................ 47/66 D |
| 547677 | 3/1931 | Germany ........................ 47/66 D |
| 1033946 | 7/1958 | Germany ........................ 47/66 D |
| 4120658 | 12/1992 | Germany ............................ 47/80 |
| 22647 | 10/1912 | United Kingdom ................. 47/80 |

*Primary Examiner*—Henry E. Raduazo
*Attorney, Agent, or Firm*—Dunlap & Codding

[57] ABSTRACT

A drain insert for a plant container having a vertically disposed drain hole in the bottom portion thereof which permits proper drainage of excess fluids through the drain hole, while substantially eliminating the loss of potting medium through the drain hole. The drain insert includes a low profile body member having a plurality of first fluid flow passageways extending therethrough and a plurality of stabilizer members extending from the body member and positionable with the drain hole so that the body member is stabilized in a covering position a preselected distance above the drain hole. The stabilizer members cooperate to define a second fluid flow passageway having a substantially vertically disposed first portion and a plurality of substantially horizontally disposed second portions. The first and second portions of the second fluid flow passageway openly communicate so that fluid communication is established between the second fluid flow passageway and the first fluid flow passageways and fluid passing to the bottom portion of the container is discharged into the drain hole.

2 Claims, 1 Drawing Sheet

PLANT CONTAINER DRAIN INSERT

BACKGROUND OF THE INVENTION

1. Field of the Invention

The present invention relates to plant containers, and more particularly but not by way of limitation, to a drain insert positionable in a vertically disposed drain hole formed in a bottom portion of a plant container.

2. Description of the Prior Art

House plants are customarily maintained in containers or receptacles, such as terracotta pots. Typically, the plant containers are provided with a central, vertically extending drain hole in their bottom portions in order to provide proper drainage of excess water and moisture from the growth medium. However, growth medium is often lost through the drain hole of the containers when the plant is watered. Thus, when first potting a plant, horticulturists generally recommend that an object, such as large gravel or similar materials, be placed in the bottom of the containers so as to cover the drain hole and thereby restrict potting medium loss, while still providing the desired drainage.

Drain inserts for plant containers have heretofore been proposed by the prior art. In an effort to overcome the problem of potting medium loss through the drain hole of a container, without sacrificing the desired drainage characteristics of the container, the prior art has proposed various types of drain inserts. Representative of such prior art is the plant pot drain disclosed in Shaw, U.S. Pat. No. 4,571,883. The Shaw plant pot drain device has a perforated cylindrical body, a radially extending disc connected to a lower end portion of the perforated cylindrical body and an imperforate cylindrical member connected to the disc for aligning and stabilizing the device in the drain hole of the pot or container. Thus, the Shaw drain device is relatively complex in structure and it extends upwardly into the container which could conceivably interfere with the growth of the root system of a potted plant.

A need exists for a drain insert for use with plant containers which is simple in construction, economical to manufacture, has a relatively low profile and which can be maintained in a stable, covering position relative to the drain hole of a container so as to provide proper drainage while preventing the loss of potting medium through the drain hole. It is to such a drain insert that the present invention is directed.

SUMMARY OF THE INVENTION

According to the present invention, an improved drain insert is provided for a plant container having a vertically disposed drain hole in the bottom portion thereof which permits proper drainage of excess fluids through the drain hole, while substantially eliminating the loss of potting medium through the drain hole. Broadly, the drain insert includes a low profile body member having a plurality of first fluid flow passageways extending therethrough and a plurality of spatially disposed stabilizer members positionable within the drain hole of the container for stabilizing the body member in a covering position a preselected distance above the drain hole. The stabilizer members define a second fluid flow passageway having a first portion and a plurality of second portions. The first portion of the second fluid flow passageway is substantially vertically disposed and openly communicate with the second portions of the second fluid flow passageway, which are substantially horizontally disposed, so that fluid communication is established between the second fluid flow passageway and the first fluid flow passageways. Thus, fluid passing to the bottom portion of the container is discharged into the drain hole via the first fluid flow passageways and the first and second portions of the second fluid flow passageway.

More specifically, the body member of the drain insert of the present invention is a substantially planar member having a diameter greater than the diameter of the drain hole; and the drain insert further includes a plurality of spatially disposed stand-off members which extend from a lower surface of the body member. The stand-off members maintain the body member a preselected distance above the drain hole and cooperate with the interior surface of the base portion of the container and the planar body member to define a third fluid flow passageway so that fluids can flow through the third fluid flow passageway for discharge into the drain hole via the first and second portions of the second fluid flow passageway.

An object of the present invention is to provide a drain insert for a plant container having a drain hole formed in the bottom portion thereof which permits proper drainage of fluids from the container without loss of potting medium.

Another object of the present invention, while achieving the before-stated object, is to provide a low profile drain insert for a plant container having a drain hole in the bottom portion thereof.

Yet another object of the present invention, while achieving the before-stated objects, is to provide a drain insert for a plant container having a drain hole in the bottom portion thereof which is durable in construction, economical to manufacture and which does not interfere with the growth of a plant potted in the container.

Other objects, features and advantages of the present invention will become clear upon reading the following detailed description in conjunction with the drawings and the appended claims.

DETAILED DESCRIPTION

Figure 1:
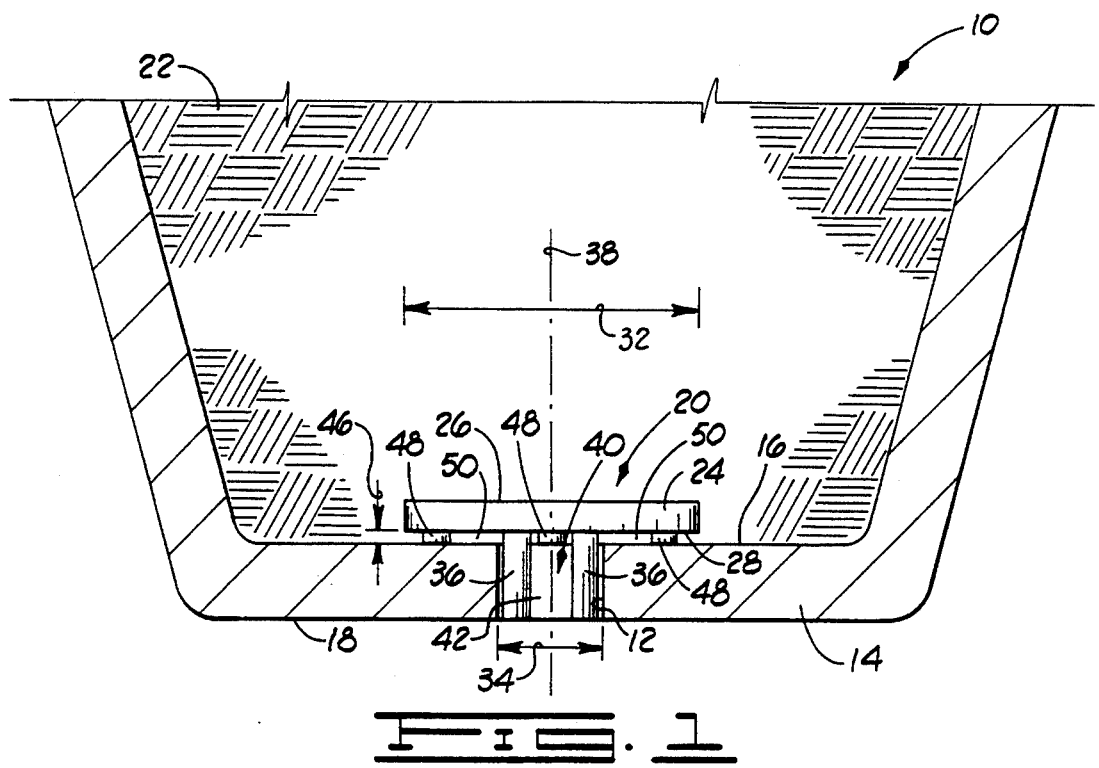
FIG. 1 is a fragmental cross sectional view of a plant container having a drain insert of the present invention disposed in a covering position over a drain hole of the container.

Referring now to the drawings, and particularly to FIG. 1, a plant container 10 is illustrated having a drain hole 12 formed in a bottom or base portion 14. The drain hole 12 is a substantially vertically extending hole which extends from an interior surface 16 of the plant container 10 to an exterior surface 18 thereof. A drain insert 20 of the present invention is disposed in the plant container 10 so as to be in a covering position over the drain hole 12; and the plant container 10 is filled with soil or a potting medium 22.

Figures 2, 3:
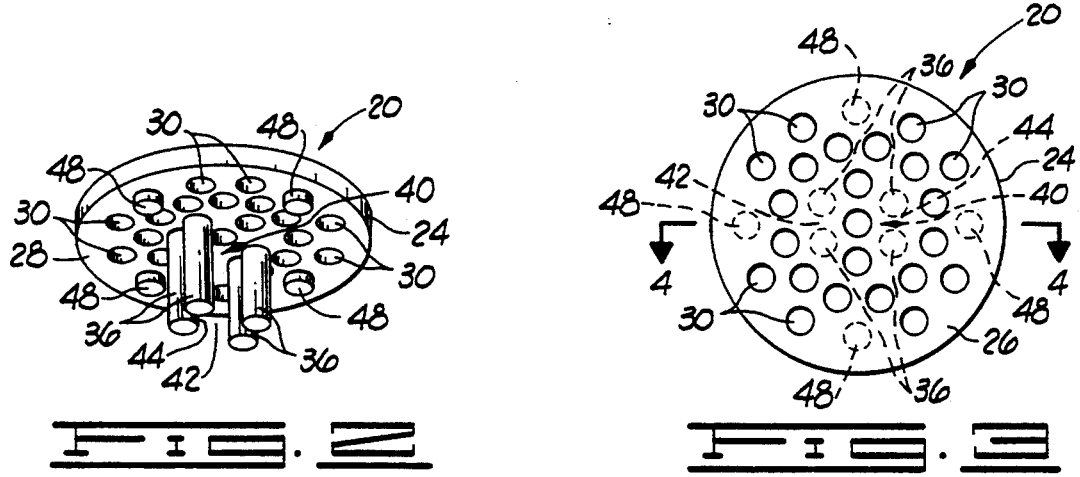
FIG. 2 is a perspective view of the drain insert of the present invention depicting the lower side thereof.
FIG. 3 is a top plan view of the drain insert of the present invention.
Figure 4:
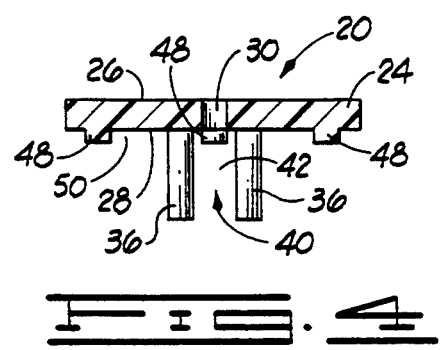
FIG. 4 is a cross sectional view of the drain insert of FIG. 3 taken along line 4—4.

Referring more specifically to FIGS. 2–4, the drain insert 20 is provided with a substantially planar body member 24 having an upper surface 26 and a lower surface 28. First fluid flow passageways 30 extend between the upper and lower surfaces 26, 28 of the body member 24 (FIGS. 2 and the body member 24 has a diameter 32 greater than a diameter 34 of the drain hole 12 (FIG. 1).

A plurality of stabilizer members 36 extend from the lower surface 28 of the planar body member 24. The stabilizer members 36 are spatially disposed about a central vertical axis 38 of the planar body member 24 and, when positioned in the drain hole 12, stabilize the planar body member 24 in the covering position over the drain hole 12 substantially as shown in FIG. 1.

The spatially disposed stabilizer members 36 also cooperate to define a second fluid flow passageway 40 in the drain insert 20. The second fluid flow passageway 40 is characterized as having a first portion 42 and a plurality of second portions 44. That is, the first portion 42 of the second fluid flow passageway 40 is formed between the stabilizer members 36 and is substantially vertically disposed; and the second portions 44 of the second fluid flow passageways 40, which are substantially vertically disposed, are formed between adjacently disposed stabilizer member 36 substantially as shown. Thus, the first and second portions 42, 44 of the second fluid flow passageway 40 openly communicate with each other so that fluid communication is established between the first fluid flow passageways 30 in the body member 24 and the second fluid flow passageway 40.

To maintain the body member 24 a preselected distance 46 above the interior surface 16 of the base portion 14 of the plant container 10, while at the same time cooperating with the stabilizer members 36 to stabilize the planar body member 24 in the covering position over the drain hole 12 (FIG. 1), the drain insert 20 further includes a plurality of spatially disposed stand-off members 48. The stand-off members 48, which have a length less than the length of the stabilizer members 36, extend from the lower surface 28 of the planar body member 24; and the stand-off members 48 are spatially disposed about the stabilizer members 36 substantially as shown. Thus, the stand-off members 48 cooperate with the planar body member 24 of the drain insert 20 to provide third fluid flow passageways 50 (FIG. 1) between the planar body member 24 and the interior surface 16 of the base portion 14 of the plant container 10.

The third fluid flow passageways 50 openly communicate with the substantially horizontally disposed second portions 44 of the second fluid flow passageway 40 and the third fluid flow passageway 50 provide a substantially straight line radial flow path between the planar body member 24 and the interior surface 16 of the base portion 14 of the plant container 10. Thus, excess fluid can be removed from the plant container 10 via the drain hole 12 by passage of the fluid through the first, second and third fluid flow passageways 30, 40 and 50; by passage through the second and third fluid flow passageways 40, 50; or by a combination of the before-mentioned flow paths.

When employing the drain insert 20 of the present invention, the drain insert 20 is positioned in the plant container 10 such that the stabilizer members 36 extend into the drain hole 12 of the plant container 10 and the stand-off members 48 supportingly engage the interior surface 16 of the base portion 14 of the plant container 10 substantially as shown in FIG. 1. After the drain insert 20 has been properly positioned in the plant container 10, potting medium 22 is placed in the plant container 10 prior to potting of a plant.

The drain insert 20 of the present invention, which is desirably of unitary construction, can be fabricated of any suitable material which will not harm the potting medium 22 or the plants. Examples of materials which can be employed in the fabrication of the drain insert 20 are ceramic and polymeric materials.

From the foregoing description, it is clear that the present invention is well adapted to carry out the objects and attain the ends and advantages mentioned, as well as those inherent therein. While a presently preferred embodiment of the invention has been described for purposes of this disclosure, numerous changes may be made which will readily suggest themselves to those skilled in the art, which changes are encompassed within the spirit of the invention disclosed and as defined in the appended claims.

What is claimed is:

1. A drain insert for use in a plant container having a base portion containing a vertically disposed drain hole extending from an interior surface of the base portion to an exterior portion thereof, the drain insert comprising:

a substantially planar body member having an upper surface, a lower surface and a plurality of first fluid flow passageways extending therebetween, the planar body member having a diameter greater than the diameter of the drain hole;

stabilizing means extending from the lower surface of the planar body member and positionable within the drain hole of the plant container for stabilizing the planar body member in a covering position over the drain hole, the stabilizing means comprising a plurality of cylindrically shaped stabilizer members disposed in a spatial relationship so as to define a second fluid flow passageway therebetween; and stand-off means for maintaining the planar body member a preselected distance above the interior surface of the base portion of the plant container so as to define a third fluid flow passageway providing a substantially straight line radial fluid flow path between the planar body member and the interior surface of the base portion of the plant container, the stand-off means comprising a plurality of spatially disposed, cylindrically shaped stand-off members extending from the lower surface of the planar body member adjacent to the outer peripheral edge of the planar body member and engaging the base portion of the plant container when the stabilizer members are positioned within the drain hole of the plant container, the third fluid flow passageway being in open communication with the first fluid flow passageways and the second fluid flow passageway to provide substantially unrestricted fluid drainage from the plant container.

2. The drain insert of claim 1 wherein the planar body member is further defined as having a central vertical axis, and wherein at least one of the first fluid flow passageways is positioned near the central vertical axis of the planar body member so as to be in direct and open communication with the second fluid flow passageway.

* * * * *

UNITED STATES PATENT AND TRADEMARK OFFICE
CERTIFICATE OF CORRECTION

PATENT NO. : 5,448,854

DATED : September 12, 1995

INVENTOR(S) : Jeffrey G. Hirsch, Regina S. Hirsch

It is certified that error appears in the above-identified patent and that said Letters Patent is hereby corrected as shown below:

Column 4, Lines 26 & 27, please correct formatting error after "surface, a" so first element of claim reads as follows:

1. A drain insert for use in a plant container having a base portion containing a vertically disposed drain hole extending from an interior surface of the base portion to an exterior portion thereof, the drain insert comprising:
a substantially planar body member having an upper surface, a lower surface and a plurality of first fluid flow passageways extending therebetween, the planar body member having a diameter greater than the diameter of the drain hole;

Signed and Sealed this

Thirtieth Day of January, 1996

Attest:

BRUCE LEHMAN

Attesting Officer

Commissioner of Patents and Trademarks